（12） United States Patent
Ohara et al.

(10) Patent No.: US 12,291,762 B2
(45) Date of Patent: May 6, 2025

(54) METHOD FOR MANUFACTURING NICKEL AND COBALT-CONTAINING SOLUTION FROM HYDROXIDE CONTAINING NICKEL AND COBALT

(71) Applicant: SUMITOMO METAL MINING CO., LTD., Tokyo (JP)

(72) Inventors: Hideki Ohara, Niihama (JP); Shota Sanjo, Niihama (JP); Masatoshi Takano, Niihama (JP); Satoshi Asano, Niihama (JP); Hiroshi Kobayashi, Niihama (JP); Yusuke Senba, Niihama (JP); Hiroto Watanabe, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 778 days.

(21) Appl. No.: 17/437,588

(22) PCT Filed: Mar. 16, 2020

(86) PCT No.: PCT/JP2020/011512
§ 371 (c)(1),
(2) Date: Sep. 9, 2021

(87) PCT Pub. No.: WO2020/196046
PCT Pub. Date: Oct. 1, 2020

(65) Prior Publication Data
US 2022/0154308 A1    May 19, 2022

(30) Foreign Application Priority Data

Mar. 26, 2019  (JP) .................................. 2019-058927
Aug. 30, 2019  (JP) .................................. 2019-158822

(51) Int. Cl.
C22B 3/38    (2006.01)
C22B 3/00    (2006.01)
C22B 3/08    (2006.01)

(52) U.S. Cl.
CPC ............ *C22B 23/0461* (2013.01); *C22B 3/08* (2013.01); *C22B 3/38* (2021.05); *C22B 23/043* (2013.01)

(58) Field of Classification Search
CPC ..... C22B 23/043; C22B 23/0461; C22B 3/08; C22B 3/22; C22B 3/38; C22B 3/3844; C22B 3/3846; B01D 11/0492
See application file for complete search history.

(56) References Cited

U.S. PATENT DOCUMENTS 9,017,640 B2    4/2015  Nakai et al.
2014/0294703 A1  10/2014  Ozaki et al.
(Continued)

FOREIGN PATENT DOCUMENTS

CA    2 895 486 C    7/2016
CN    102010993 A    4/2011
(Continued)

OTHER PUBLICATIONS

Office Action mailed Feb. 16, 2023, issued for Japanese Patent Application No. 2021-509102 and a partial English translation thereof.
(Continued)

*Primary Examiner* — Nicholas A Wang
(74) *Attorney, Agent, or Firm* — Troutman Pepper Locke LLP; James E. Armstrong, IV; Nicholas J. DiCeglie, Jr.

(57) ABSTRACT

A method of manufacturing a cobalt-nickel-containing solution including: preparing a crude nickel hydroxide and/or a crude cobalt hydroxide as a starting material, the crude nickel or cobalt hydroxide containing cobalt and nickel and
(Continued)

elements except the cobalt and nickel as impurities, the crude nickel hydroxide containing the nickel more than the cobalt, and the crude cobalt hydroxide containing the cobalt more than the nickel; a water-washing process for obtaining a post-water-washing crude hydroxide from the starting material; a leaching process for obtaining a post-leaching solution from the post-water-washing crude hydroxide; a neutralization process of subjecting the post-leaching solution to neutralization and solid-liquid-separation to remove the impurities as a post-neutralization residue containing one or more of iron, silicon, aluminum, and chromium, thereby obtaining a post-neutralization solution; and an extraction process of subjecting the post-neutralization solution to solvent extraction to obtain a post-extraction solution containing cobalt and nickel with the impurities reduced.

1 Claim, 3 Drawing Sheets

(56) References Cited

U.S. PATENT DOCUMENTS

| | | |
|---|---|---|
| 2014/0308183 A1 | 10/2014 | Kikuta et al. |
| 2019/0152797 A1 | 5/2019 | Liu et al. |
| 2019/0194031 A1 | 6/2019 | Ohara et al. |

FOREIGN PATENT DOCUMENTS

| | | | |
|---|---|---|---|
| CN | 102126761 A | | 7/2011 |
| CN | 103221557 | * | 7/2013 |
| CN | 103221557 A | | 7/2013 |
| CN | 104073635 A | | 10/2014 |
| CN | 103221557 B | | 4/2015 |
| CN | 104073635 B | | 6/2016 |
| CN | 108002408 A | | 5/2018 |
| JP | H11229056 | * | 8/1999 |
| JP | 2000203848 | * | 7/2000 |
| JP | 2006-001817 A | | 1/2006 |
| JP | 2011-195920 A | | 10/2011 |
| JP | 2013-112530 A | | 6/2013 |
| JP | 2014-029006 A | | 2/2014 |
| JP | 2014019909 | * | 2/2014 |
| JP | 2014-156649 A | | 8/2014 |
| JP | 2017-226559 A | | 12/2017 |
| JP | 2017226559 | * | 12/2017 |
| JP | 2018-039682 A | | 3/2018 |
| KR | 101412462 | * | 6/2014 |
| WO | 01/62989 A1 | | 8/2001 |
| WO | 2018/076993 A1 | | 5/2018 |

OTHER PUBLICATIONS

European Search Report (EESR) dated Apr. 12, 2023, issued for the corresponding EP patent application No. 20778561.9.
1st Examination Report dated Jun. 22, 2022, issued for the corresponding CN patent application No. 202080013276.7.

* cited by examiner

METHOD FOR MANUFACTURING NICKEL AND COBALT-CONTAINING SOLUTION FROM HYDROXIDE CONTAINING NICKEL AND COBALT

BACKGROUND

Field of the Invention

The present invention relates to a method of manufacturing a solution containing cobalt and nickel from a hydroxide containing cobalt and nickel, for example, a hydroxide containing cobalt, nickel, manganese, magnesium, iron, silicon, calcium, zinc, aluminum, copper, and chromium.

Description of the Related Art

In recent years, various positive electrode materials have been developed as positive electrode materials for lithium ion batteries which are secondary batteries. In particular, in addition to cobalt lithium oxide, which is conventionally used, attention has recently been focused on a nickel-cobalt-manganese (NCM)-based positive electrode material called a ternary system, which is composed of a composite metal oxide containing nickel and cobalt, and a positive electrode material such as a nickel-cobalt-aluminum (NCA)-based positive electrode material called a nickel base.

Against such a background, there is an increasing demand for collecting nickel and cobalt from nickel-containing raw materials such as nickel oxide ore. These elements have conventionally been collected separately, but recently, there is an increasing demand for collecting the elements together. In order to meet such increase in demand, there is an increasing expectation that a solution containing both nickel and cobalt will be manufactured from a nickel-containing raw material such as nickel oxide ore and be used as a raw material for a positive electrode material.

However, many nickel-containing raw materials such as nickel oxide ore contain impurities such as manganese, magnesium, iron, silicon, calcium, zinc, aluminum, copper, and chromium in addition to cobalt. This leads to contamination of a raw material of a positive electrode material with the impurities, resulting in containing of the impurities in an electrode manufactured with this raw material, which may significantly deteriorate battery characteristics such as charge and discharge capacity of a lithium ion battery. Therefore, it is important to manufacture a solution with high purity for use as a raw material for a positive electrode material.

In view of the above importance, a method of manufacturing a solution for obtaining both high purity nickel solution and cobalt solution from a nickel-containing raw material such as nickel oxide ore has been disclosed. For example, JP 2011-195920 A discloses a method of manufacturing a solution using a wet processing such as a solvent extraction method. In this method, nickel and cobalt solutions are manufactured separately, but it is not easy to separate these metals because the metals have similar chemical properties. The method has thereby required a large manufacturing cost.

Since NCM and NCA are positive electrode materials that need a large amount of cobalt, only cobalt contained in nickel-containing raw materials such as nickel oxide ore and nickel hydroxide may be insufficient. In this case, another cobalt solution has needed to be prepared.

A cobalt solution suitable for such an application is often manufactured by dissolving in acid electrolytic cobalt manufactured by an electrolysis method, cobalt briquette manufactured by a hydrogen reduction method, or the like.

However, there has been a problem that a large amount of acid and a heat source for heat retention in order to dissolve the metal with increased purity have been required and the process has become complicated.

On the other hand, in cobalt smelting, cobalt hydroxide containing a large amount of impurities may be produced as an intermediate product. Therefore, if the cobalt hydroxide produced in cobalt smelting can also be used as a raw material in addition to a raw material mainly containing nickel such as nickel hydroxide, a solution can be manufactured efficiently and thus preferably.

In this way, development of technique has been expected for manufacturing a solution containing nickel and cobalt with high purity and with reduced impurities from nickel hydroxide and cobalt hydroxide produced during nickel smelting and cobalt smelting, respectively.

The present invention has been made in view of such circumstances and provides a solution manufacturing method in which a high purity solution containing both nickel and cobalt can be obtained from a hydroxide containing nickel and cobalt as well as the manufacturing cost is effectively suppressed.

SUMMARY

As a result of intensive research to achieve the object, the present inventors have found that the problems can be effectively solved by treating a solution in a manufacturing process including a water-washing process, a leaching process, a neutralization process, and an extraction process, and have completed the present invention.

That is, the first aspect of the present invention is a method of manufacturing a cobalt-nickel-containing solution, the method including: preparing at least one of a crude nickel hydroxide and a crude cobalt hydroxide as a starting material, the crude nickel hydroxide containing cobalt and nickel, and one or more elements of magnesium, calcium, iron, silicon, manganese, zinc, copper, aluminum, and chromium other than the cobalt and nickel as impurities, and containing the nickel more than the cobalt, and the crude cobalt hydroxide containing cobalt and nickel, and one or more elements of magnesium, calcium, iron, silicon, manganese, zinc, copper, aluminum, and chromium other than the cobalt and nickel as impurities, and containing the cobalt more than the nickel; a water-washing process in which water is added to the starting material, stirred and mixed to form a slurry, the slurry is filtered to obtain a sediment, which is then washed with water, and one or more of magnesium and calcium as the impurities are discharged from the sediment to obtain a post-water-washing crude hydroxide; a leaching process in which the post-water-washing crude hydroxide is subjected to leaching with an acid to obtain a post-leaching solution containing cobalt and nickel, and one or more of manganese, magnesium, iron, silicon, calcium, zinc, aluminum, copper, and chromium as the impurities; a neutralization process in which a pH adjusting agent is added to the post-leaching solution to perform neutralization, and solid-liquid separation is then performed to remove a post-neutralization residue containing one or more of iron, silicon, aluminum, and chromium as the impurities, thus obtaining a post-neutralization solution; and an extraction process in which the post-neutralization solution obtained is subjected to solvent extraction with an extractant to extract and remove one or more of manganese, magnesium, calcium, zinc, and copper as the impurities, thus obtaining a post-extraction solution containing both cobalt and nickel and having the impurities reduced.

A second aspect of the present invention is the method of manufacturing a cobalt-nickel-containing solution according to the first aspect, in which the concentration of the slurry formed by stirring and mixing in the water-washing process is controlled in a range of 130 to 340 g/l.

A third aspect of the present invention is the method of manufacturing a cobalt-nickel-containing solution according to the first or the second aspects, in which a pH of the post-leaching solution is controlled in a range of 0.5 to 2.1.

A fourth aspect of the present invention is the method of manufacturing a cobalt-nickel-containing solution according to any of the first to third aspects, in which a pH of the post-neutralization solution is controlled in a range of 4.6 to 5.0.

A fifth aspect of the present invention is the method of manufacturing a cobalt-nickel-containing solution according to any of the first to fourth aspects, in which a pH of the post-extraction solution is controlled in a range of 2.0 to 2.4.

A sixth aspect of the present invention is the method of manufacturing a cobalt-nickel-containing solution according to any of the first to fifth aspects, in which a reducing agent is added to a leachate and the redox potential of the leachate is controlled to 715 [mV vs. NHE] or less in the leaching process.

A seventh aspect of the present invention is the method of manufacturing a cobalt-nickel-containing solution according to any of the first to sixth aspects, in which the extractant in the extraction process is an organic solvent containing an alkylphosphonic acid ester.

An eighth aspect of the present invention is the method of manufacturing a cobalt-nickel-containing solution according to any of the first to seventh aspects, the method further including a washing process in which a part of nickel and cobalt contained in a post-extraction organic phase obtained in the extraction process is back-extracted into an aqueous phase to remove one or more of manganese, magnesium, calcium, zinc, and copper as the impurities into a post-washing organic phase as an organic phase, thus obtaining a post-washing solution as the aqueous phase containing nickel and cobalt, in which the impurities are reduced; and a back extraction process in which the post-washing organic phase is further subjected to back extraction to back-extract manganese, magnesium, calcium, zinc, and copper as the impurities into an aqueous phase and to remove the impurities into a post-back-extraction solution as the aqueous phase, thus obtaining a post-back-extraction organic phase in which the impurities are reduced.

According to the present invention, a high purity solution containing both cobalt and nickel and having reduced impurities can be manufactured from a hydroxide containing cobalt and nickel.

Further, in the present invention, a process for separating cobalt and nickel is unnecessary, and thereby the manufacturing cost can be effectively suppressed.

DETAILED DESCRIPTION

The present invention is a method of manufacturing a cobalt-nickel-containing solution in which both cobalt and nickel are contained and types and concentrations of impurities are reduced, from a hydroxide containing cobalt, nickel, and impurities other than the cobalt and the nickel as a starting material.

Regarding cobalt, nickel, and the impurities other than the cobalt and the nickel as the starting material, the hydroxide contains manganese, magnesium, iron, silicon, calcium, zinc, aluminum, copper, and chromium other than the cobalt and the nickel. The hydroxides can include a "crude nickel hydroxide" in which the nickel content is higher than the cobalt content, a "crude cobalt hydroxide" in which the cobalt content is higher than the nickel content, and a "mixed crude hydroxide" that is a mixture of the "crude cobalt hydroxide" and the "crude nickel hydroxide".

In the present invention, it is not necessary that the hydroxide contains all of the above impurities, and the manufacturing method of the present application functions effectively even if one or more of the above impurities are not contained in the hydroxide. Further, even when impurities other than the above impurities are contained therein, these impurities can be reduced, but a desirable effect is shown under the presence of the above-named impurities.

Hereinafter, specific embodiments of the present invention will be described in detail with reference to the drawings. In this regard, when the crude nickel hydroxide is used as a starting material, when the crude cobalt hydroxide is used as a starting material, or when the mixed crude hydroxide in which both the crude nickel hydroxide and crude cobalt hydroxide are mixed in an arbitrary ratio is used as a starting material, the embodiments can also be performed in the same manner.

It should be noted that the present invention is not limited to the following embodiments, and various modifications can be made without departing from the scope of the present invention.

Figure 1:
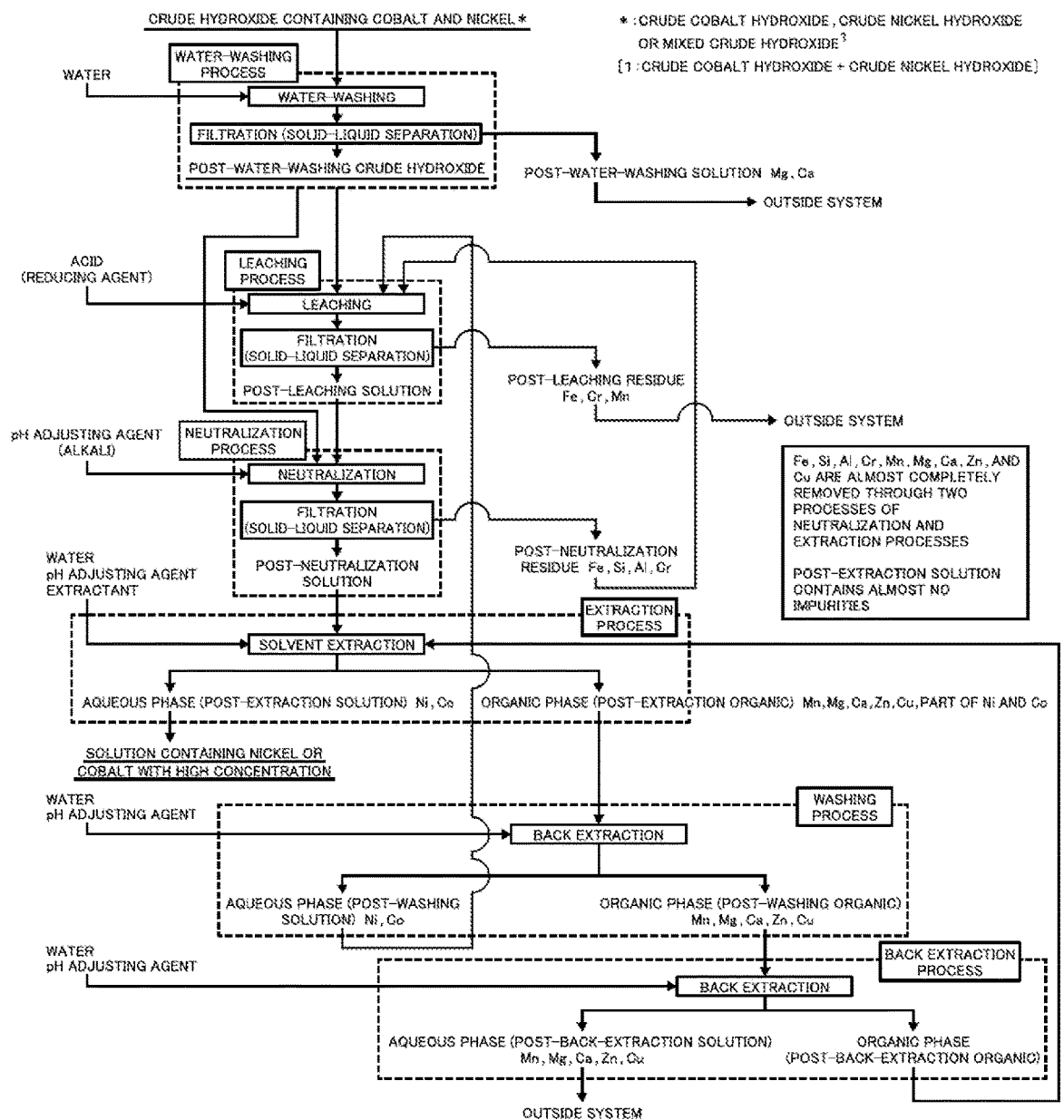
FIG. 1 is a flowchart for illustrating the flow of method of manufacturing the solution.

As shown in FIG. 1, a method of manufacturing a solution according to a specific embodiment of the present invention includes a water-washing process in which water-washing is performed on a crude hydroxide as a starting material containing cobalt, nickel, and impurities other than the cobalt and the nickel, specifically on the crude nickel hydroxide, the crude cobalt hydroxide, or the mixed crude hydroxide that is a mixture of the crude cobalt hydroxide and the crude nickel hydroxide to obtain a post-water-washing crude hydroxide produced according to the starting material; a leaching process in which the post-water-washing crude hydroxide is subjected to leaching with an acid leachate and further with a leachate in which the redox potential is controlled to a predetermined potential by adding a reducing agent to obtain a post-leaching solution; a neutralization process in which a post-neutralization solution is obtained from the post-leaching solution; and an extraction process in which the post-neutralization solution is subjected to solvent extraction with an extractant to obtain a post-extraction solution, whereby a high purity solution containing both cobalt and nickel and having reduced components other than cobalt and nickel is obtained as the post-extraction solution.

Further, to the above-described manufacturing method, added are a washing process in which a post-extraction organic phase is subjected to back extraction to obtain a post-washing solution and a post-washing organic phase, and a back extraction process in which the post-washing organic phase is subjected to back extraction to obtain a post-back-extraction solution and a post-back-extraction organic phase, and thereby more efficient manufacturing of a solution, in which the losses of cobalt and nickel are suppressed, is possible.

Each process will be described below.

[Water-Washing Process]

The water-washing process is a process of washing the crude hydroxide, in which, using the crude nickel hydroxide, the crude cobalt hydroxide, or the mixed crude hydroxide composed of a mixture of the crude cobalt hydroxide and crude nickel hydroxide as a starting material, water is added to the starting material, which is then stirred and mixed to form a slurry, and by filtering the slurry, magnesium and calcium as impurities constituting water soluble substances are discharged into the water to obtain a post-water-washing crude hydroxide.

For the washing of the crude hydroxide in this water-washing process, it is preferable that magnesium and calcium are eluted from the crude hydroxide as much as possible, while nickel elution is suppressed. Such washing can be performed by adjusting the slurry concentration after stirring and mixing to a predetermined concentration range. In this case, the concentration range is not particularly limited as long as it is a concentration range in which magnesium and calcium are eluted from the crude hydroxide as much as possible while suppressing the elution of nickel, but for example, water may be added so that the slurry concentration is adjusted in a range of 130 to 340 g/l, whereby the water-washing process can be performed effectively.

In this regard, if the slurry concentration is set to be higher than 340 g/l, magnesium and calcium discharged into the solution are decreased.

On the contrary, if the slurry concentration is set to be lower than 130 g/l, the amounts of nickel hydroxide and cobalt hydroxide dissolved in the solution increase as the amount of the solution increases, and the amounts of the crude nickel hydroxide and the crude cobalt hydroxide contained in the post-water-washing crude hydroxide decrease.

The magnesium content in the post-water-washing crude hydroxide is preferably less than 10% by mass. Within this concentration range, the subsequent processes can be effectively performed.

[Leaching Process]

The leaching process is a process in which the post-water-washing crude hydroxide obtained in the water-washing process is subjected to an acid of a leachate to leach elements other than compounds of iron, chromium, and manganese which are contained in the post-water-washing crude hydroxide, and this is subjected to solid-liquid separation by filtration to remove the compounds of iron, chromium, and manganese as a post-leaching residue, thereby obtaining a post-leaching solution.

In addition, for the leaching, it may be performed by adding a post-neutralization residue produced in the neutralization process.

The acid used for the leaching is not particularly limited. For example, sulfuric acid or a post-washing solution produced in the washing process may be used.

For the leaching of the post-water-washing crude hydroxide in the leaching process, it is preferable to suppress decrease in the leaching rates of nickel and cobalt into the leachate. Such leaching can be performed by adjusting a pH of the post-leaching solution to a predetermined pH range. The pH range is not particularly limited as long as it is a pH range that suppresses decrease in the leaching rates of nickel and cobalt into the leachate, but for example, the pH of the post-leaching solution may be adjusted to be in a range of 0.5 to 2.1, whereby the leaching process can be performed effectively.

In this regard, if the pH is adjusted to be lower than 0.5, the amount of the acid used rises, while the leaching rates hardly rise.

On the contrary, if the pH is adjusted to be higher than 2.1, the leaching rates of nickel and cobalt from the post-water-washing crude hydroxide decrease.

Furthermore, in the leaching, it is suitable for further enhancing the leaching rates to reduce the valence of cobalt and nickel contained in the crude cobalt hydroxide and crude nickel hydroxide from trivalent to divalent, that is, to a form having better solubility in the acid.

Specifically, a reducing agent is added to the leachate to allow the redox potential of the leachate to be in a desired range. From FIG. 2, the redox potential for reducing cobalt and nickel to divalent is set to 715 [mV vs. NHE], which enables leaching rates of 99% or more to be expected.

Figure 2:
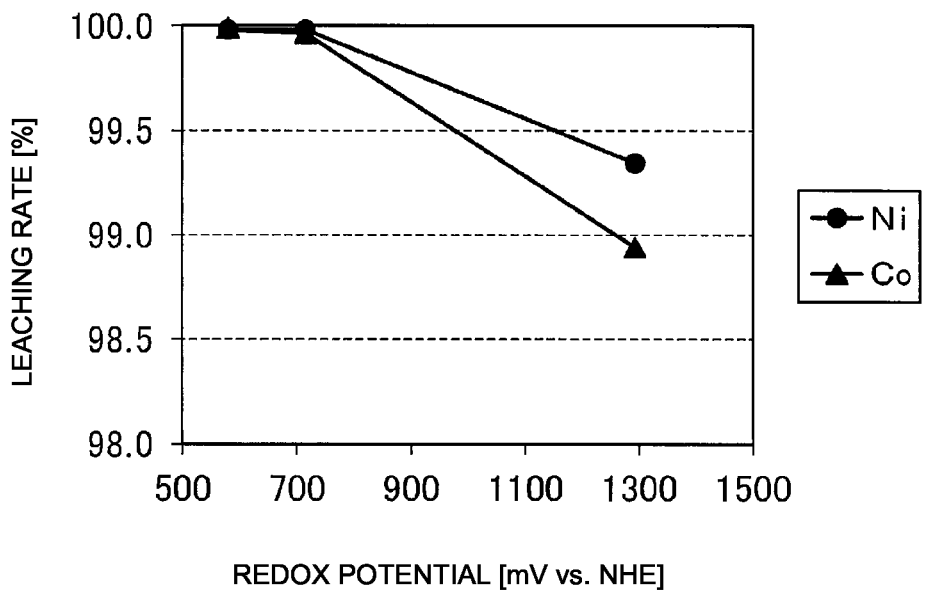
FIG. 2 is a graph showing the effect of the redox potential of a leachate on the leaching rates of cobalt and nickel.

FIG. 2 was obtained by a procedure in which 50 g of a post-water-washing crude cobalt hydroxide obtained by adjusting the slurry concentration to 200 g/l in the water-washing process was prepared, and sodium hydrogen sulfite was added as a reducing agent to a leachate for the crude cobalt hydroxide, the leachate having a pH adjusted to 1.3 with pure water and sulfuric acid, to adjust the redox potential, and then the post-leaching solution, which were vacuum-filtered with a 5C filter paper and a vacuum pump, and the residue after the filtration were analyzed for the components with an ICP emission spectrometer to confirm whether each element was distributed to the post-leaching solution or the residue. In this procedure, the added amounts of pure water and sulfuric acid were adjusted so that the cobalt concentration in the leachate was about 100 g/l when the post-water-washing crude nickel hydroxide was completely dissolved, and the leachate was stirred with a motor and a stirring blade during the reaction and held for 120 minutes.

[Neutralization Process]

The neutralization process is a process in which a pH adjusting agent (alkali) is added to the post-leaching solution obtained in the leaching process to precipitate iron, silicon, aluminum, and chromium which are present in the leachate to form a solution, and the solution is subjected to solid-liquid separation by filtration to remove the iron, silicon, aluminum, and chromium as a post-neutralization residue, thereby obtaining a post-neutralization solution.

The pH adjusting agent (alkali) used for pH adjustment is not particularly limited. For example, the post-water-washing crude hydroxide may be used.

For the neutralization of the post-leaching solution in the neutralization process, it is preferable to suppress decrease in the removal rate of aluminum. Such neutralization can be performed by adjusting a pH of the post-neutralization solution to a predetermined pH range. The pH range is not particularly limited as long as it is a pH range that suppresses decrease in the removal rate of aluminum, but for example, the pH of the post-neutralization solution may be adjusted to be in a range of 4.6 to 5.0, whereby the neutralization process can be performed effectively.

In this regard, if the pH is adjusted to be lower than 4.6, the distribution rate of aluminum to the post-neutralization residue decreases.

On the contrary, if the pH is adjusted to be higher than 5.0, the amount of the alkali used increases, while the distribution rate of aluminum to the post-neutralization residue is unchanged.

It is preferable that, in the post-neutralization solution, the manganese concentration is less than 30 g/l, the magnesium concentration is less than 15 g/l, the calcium concentration is less than 1 g/l, the zinc concentration is less than 1 g/l, the copper concentration is less than 10 g/l, and the chromium concentration is less than 0.01 g/l. Within this concentration range, the subsequent processes can be effectively performed.

[Extraction Process]

The extraction process is a process in which the post-neutralization solution obtained in the neutralization process is used as an aqueous phase, and most cobalt and nickel contained in the post-neutralization solution are distributed to the aqueous phase by subjecting the post-neutralization solution (aqueous phase) to an extraction solvent (organic phase) with an alkylphosphonic acid ester as an extractant to obtain an aqueous phase (post-extraction solution) containing cobalt and nickel with high purity, which has reduced types and amounts of impurities, and an organic phase (post-extraction organic phase) containing a part of cobalt and nickel.

The impurities such as manganese, magnesium, calcium, zinc, and copper present in the post-neutralization solution are mostly distributed to the organic phase (post-extraction organic phase). The pH adjusting agent used for the extraction is not limited. For example, sodium hydroxide may be used.

For the extraction for the post-neutralization solution as the aqueous phase in the extraction process, it is preferable to suppress decrease in the distribution rates of the impurities to the post-extraction organic phase as the organic phase and suppress increase in nickel and cobalt losses.

Such extraction can be performed by adjusting a pH of the post-extraction solution of the aqueous phase to a predetermined pH range. The pH range is not particularly limited as long as it is a pH range that suppresses decrease in the distribution rates of the impurities to the post-extraction organic phase, which is the organic phase, and suppresses increase in nickel and cobalt losses, but for example, the pH may be adjusted to be in a range of 2.0 to 2.4, whereby the extraction process can be performed effectively.

In this regard, if the pH is adjusted to be lower than 2.0, large amounts of the impurities such as manganese, magnesium, calcium, zinc, and copper, especially of magnesium, remain in the post-extraction solution of the aqueous phase, and the distribution rates to the post-extraction organic phase, which is the organic phase, decrease.

On the contrary, if the pH is adjusted to be higher than 2.4, the amounts of cobalt and nickel distributed to the post-extraction solution of the aqueous phase decrease.

The "water-washing process", the "leaching process", the "neutralization process", and the "extraction process" described above constitute a method of removing impurities from the crude hydroxide (the crude nickel hydroxide, the crude cobalt hydroxide, or the mixture of the crude cobalt hydroxide and crude nickel hydroxide) containing cobalt, nickel, and other impurities. Through these processes, the impurities in the crude hydroxide can be removed, and the crude hydroxide can be purified to be a high purity nickel-cobalt-containing solution.

In particular, when the contained impurities other than cobalt and nickel are one or more of magnesium, calcium, iron, silicon, manganese, zinc, copper, aluminum, and chromium, the impurities contained can be removed from the crude hydroxide by sequentially performing the following processes: the water-washing process in which water-soluble substances in the crude hydroxide are washed with water, and magnesium and calcium as impurities are discharged into the water used for the washing to obtain a water-washed crude hydroxide; the leaching process in which the water-washed crude hydroxide is subjected to leaching with an acid, and iron, chromium, and manganese as impurities are removed as a post-leaching residue to obtain a post-leaching solution containing at least nickel and cobalt; the neutralization process in which a pH adjusting agent is added to the post-leaching solution obtained to perform neutralization, and solid-liquid separation is performed to separate a neutralization residue containing one or more of silicon and aluminum as impurities and iron and chromium remaining in the post-leaching solution to remove the neutralization residue from the post-leaching solution, thereby obtaining a post-neutralization solution containing at least nickel and cobalt; and the extraction process in which a mixed solution of the post-neutralization solution obtained in the previous neutralization process and an extractant is subjected to solvent extraction, and zinc and copper as impurities and manganese, magnesium, and calcium as impurities remaining in the post-neutralization solution are extracted from the post-neutralization solution into a post-extraction organic phase to obtain a post-extraction solution in which the impurities contained in the post-neutralization solution are reduced.

[Washing Process]

The washing process is a process in which a part of cobalt and nickel contained in the post-extraction organic phase as the organic phase obtained in the extraction process is distributed to an aqueous phase by back extraction to obtain a post-washing solution as the aqueous phase to which cobalt and nickel are extracted and a post-washing organic phase as an organic phase that is a residual solution.

The impurities such as manganese, magnesium, calcium, zinc, and copper are mostly distributed to the post-washing organic phase that is the organic phase. The pH adjusting agent used for the back extraction is not limited. For example, sulfuric acid may be used.

For the back extraction for the post-extraction organic phase as the organic phase obtained in the extraction process in this washing process, it is preferable to suppress increase in the distribution rates of the impurities to the post-washing solution of the aqueous phase and suppress increase in nickel and cobalt losses. Such back extraction can be performed by adjusting a pH of the post-washing solution of the aqueous phase to a predetermined pH range. The pH range is not particularly limited as long as it is a pH range that suppresses increase in the distribution rates of the impurities to the post-washing solution of the aqueous phase and suppresses increase in nickel and cobalt losses, but for example, the pH of the post-washing solution of the aqueous phase may be adjusted to be in a range of 1.7 to 2.3, whereby the washing process can be performed effectively.

In this regard, if the pH of the post-washing solution of the aqueous phase is adjusted to be lower than 1.7, the distribution rates of the impurities such as manganese, magnesium, calcium, zinc, and copper to the post-washing solution of the aqueous phase increase.

On the contrary, if the pH of the post-washing solution of the aqueous phase is adjusted to be higher than 2.3, the amounts of cobalt and nickel distributed to the post-washing solution of the aqueous phase decrease.

The contents of cobalt and nickel in the post-washing organic phase as the organic phase are preferably such that the content of nickel is less than 0.005 g/l and the content of cobalt is less than 0.05 g/l. Because most cobalt and nickel are collected in the post-washing solution, nickel and cobalt discharged outside the system are suppressed, and further, the post-washing solution can preferably be used as an acid used in the leaching process.

[Back Extraction Process]

The back extraction process is a process in which the impurities such as manganese, magnesium, calcium, zinc, and copper contained in the post-washing organic phase as the organic phase obtained in the washing process are distributed to an aqueous phase by back extraction to obtain a post-back-extraction solution as the aqueous phase to which the impurities are distributed and a post-back-extraction organic phase as an organic phase that is a residual solution.

A pH adjusting agent used for the back extraction is not limited. For example, hydrochloric acid may be used.

For the back extraction for the impurities contained in the post-washing organic phase as the organic phase in this back extraction process, it is preferable to suppress decrease in the distribution rates of the impurities to the post-back-extraction solution. Such back extraction can be performed by adjusting a pH of the post-back-extraction solution, which is the aqueous phase, to a predetermined pH range. The pH range is not particularly limited as long as it is a pH range that suppresses decrease in the distribution rates of the impurities to the post-back-extraction solution, but for example, the pH of the post-back-extraction solution of the aqueous phase is adjusted in a range of 0.2 to 0.5, whereby the back extraction process can be performed effectively.

In this regard, if the pH of the post-back-extraction solution of the aqueous phase is adjusted to be lower than 0.2, the amount of the acid used rises, while the distribution rates hardly rise of the impurities such as manganese, magnesium, calcium, zinc, and copper to the post-back-extraction solution of the aqueous phase.

On the contrary, if the pH of the post-washing solution is adjusted to be higher than 0.5, the amounts of the impurities distributed to the post-back-extraction solution of the aqueous phase decrease.

The total amount of impurities in the post-back-extraction organic phase is preferably less than 1.0 g/l, and the impurities such as manganese, magnesium, calcium, zinc, and copper can be preferably discharged outside the system, and the post-back-extraction organic phase obtained in this stage can be reused as a solvent for extraction.

The pH adjusting agent used in the leaching process, the neutralization process, the extraction process, the washing process, and the back extraction process is not particularly limited, and various acids and alkalis can be used.

Specifically, as an acidic pH adjusting agent, examples can be used including inorganic acids such as sulfuric acid, hydrochloric acid, nitric acid, and phosphoric acid, or organic acids.

As an alkaline pH adjusting agent, examples can be used including inorganic alkaline compounds such as lithium hydroxide, sodium hydroxide, potassium hydroxide, calcium hydroxide, nickel hydroxide, cobalt hydroxide, lithium carbonate, sodium carbonate, potassium carbonate, calcium carbonate, nickel carbonate, cobalt carbonate, lithium hydrogen carbonate, sodium hydrogen carbonate, potassium hydrogen carbonate, and calcium hydrogen carbonate, or organic alkaline compounds such as ammonia and various amines.

Furthermore, a crude nickel hydroxide can also be used as an inorganic alkaline compound.

EXAMPLES

Hereinafter, the present invention will be described in more detail with reference to Examples, but the present invention is not limited to the following Examples.

Example 1

In Example 1, an embodiment in which a crude nickel hydroxide is used as a starting material will be described.

[Water-Washing Process]

First of all, "water-washing process" conditions will be described.

First, a hydroxide having a composition shown in Table 1 was prepared as a crude nickel hydroxide. Next, 10 g of the crude nickel hydroxide was measured and fed into a beaker, to which pure water was then added to form a slurry, and the slurry concentration was adjusted to 130 to 340 g/l. Then, the adjusted slurry was subjected to the "water-washing process" in which the slurry was stirred with a motor and a stirring blade for 30 minutes, and then vacuum-filtered with a vacuum pump and a filter paper with specifications corresponding to 5 type C specified in JIS P 3801 [filter paper (for chemical analysis)].

A sediment obtained by the filtration was washed with 30 ml of pure water flowing onto it to obtain a post-water-washing crude nickel hydroxide. The used washing water was mixed with a filtrate.

Component analysis was performed on the washed "post-water-washing crude nickel hydroxide" and the filtrate to confirm whether each of calcium, magnesium, and nickel was distributed to the post-water-washing crude nickel hydroxide or the filtrate. The analysis was performed with an ICP emission spectrometer.

Next, the "water-washing process" was performed under the same operations and conditions as the case where the slurry concentration was adjusted to 130 to 340 g/l except that the slurry concentration was adjusted to a range of 40 g/l to 100 g/l, to obtain a post-water-washing crude nickel hydroxide. This post-water-washing crude nickel hydroxide and the filtrate were analyzed.

Next, except that the slurry concentration was adjusted to a range of 397 g/l to 430 g/l, the "water-washing process" was performed under the same operations and conditions as the case where the slurry concentration was adjusted to 130 to 340 g/l, to obtain a post-water-washing crude nickel hydroxide. This post-water-washing crude nickel hydroxide and the filtrate were analyzed.

Figure 3:
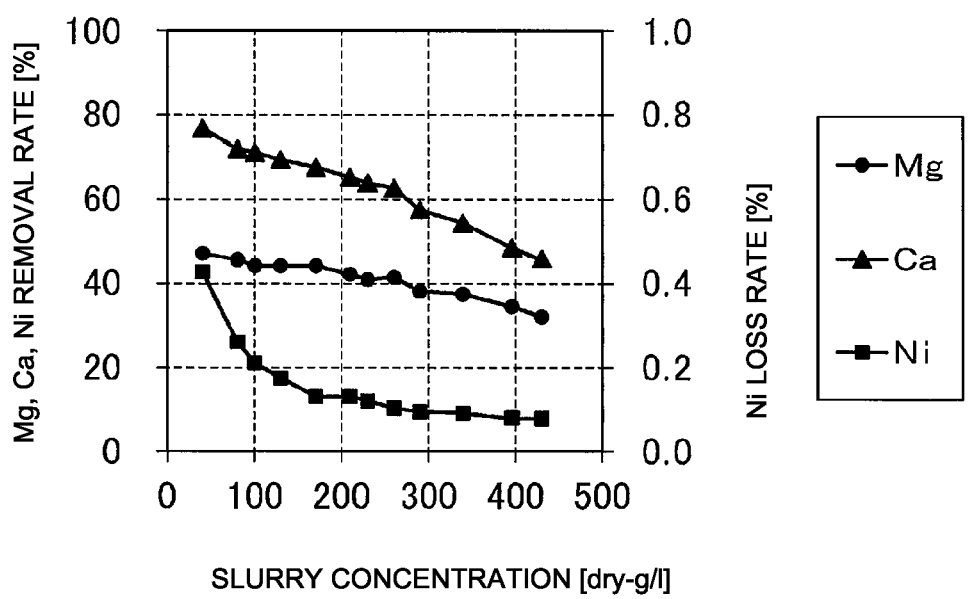
FIG. 3 is a graph showing the relationship between slurry concentration and the removal rates of metals (magnesium, calcium, and nickel).

The results of the above analyses are shown in Table 2 and FIG. 3.

TABLE 1

|  | Ni | Co | Mg | Ca | Zn | Cu | Mn | Fe | Si | Al | Cr |
|---|---|---|---|---|---|---|---|---|---|---|---|
| Crude nickel hydroxide | 42 | 1.6 | 1.6 | 0.09 | 0.37 | 0.034 | 1.7 | 1.4 | 0.75 | 0.06 | 0.01 |

[unit: wt %]

TABLE 2

| [Water-washing process] | Slurry concentration [g/l] | Distribution rate to filtrate | | |
|---|---|---|---|---|
| | | Ca [wt %] | Mg [wt %] | Ni [wt %] |
| Slurry concentration 130 to 340 [g/l] | 340 | 54 | 37 | 0.09 |
| | 290 | 58 | 38 | 0.093 |
| | 260 | 63 | 41 | 0.1 |
| | 230 | 64 | 41 | 0.12 |
| | 210 | 65 | 42 | 0.13 |
| | 170 | 68 | 44 | 0.13 |
| | 130 | 70 | 44 | 0.17 |
| Slurry concentration 40 to 100 [g/l] | 100 | 71 | 44 | 0.21 |
| | 80 | 72 | 46 | 0.26 |
| | 40 | 77 | 47 | 0.43 |
| Slurry concentration 397 to 430 [g/l] | 430 | 46 | 32 | 0.077 |
| | 397 | 49 | 34 | 0.08 |

From Tables 1 and 2 and FIG. 3, it can be seen that, when the slurry concentration was adjusted to be in the range of 40 g/l to 100 g/l, which was lower than 130 g/l, the distribution rate of nickel to the filtrate increased. The increase in the distribution rate of nickel to the filtrate indicates increase in nickel loss. On the contrary, it can be seen that, when the slurry concentration was adjusted to be in the range of 397 g/l to 430 g/l, which was higher than 340 g/l, the distribution rates of magnesium and calcium to the filtrate decreased.

This decrease in the distribution rates of magnesium and calcium to the filtrate indicates increase in magnesium and calcium remaining in the post-water-washing crude nickel hydroxide.

Therefore, it can be said that a preferable slurry concentration range after stirring and mixing in the water-washing process is 130 to 340 g/l in which range increase in nickel loss is suppressed and magnesium and calcium remaining in the post-water-washing crude nickel hydroxide are suppressed. Note that the slurry concentration is indicated by a dry weight per unit volume of the solid matter in the slurry (dry-g/l, expressed as g/l in this specification).

[Leaching Process]

Conditions of a "leaching process" performed subsequent to the "water-washing process" will be described.

A post-water-washing crude nickel hydroxide was obtained in the same manner as the case where the slurry concentration was adjusted to 130 to 340 g/l except that the slurry concentration was adjusted to 200 g/l in the water-washing process, and 215 g of the post-water-washing crude nickel hydroxide was measured and fed into a beaker, to which pure water and sulfuric acid were then added as a leachate to adjust the slurry concentration to 200 g/l. Table 3 shows the magnesium content of the post-water-washing crude nickel hydroxide used here.

The leachate prepared was stirred with a motor and a stirring blade for 120 minutes while the pH of the leachate was adjusted to 0.5 to 2.1, and was then vacuum-filtered with a vacuum pump and a filter paper with specifications corresponding to 5 type C specified in JIS P 3801 [filter paper (for chemical analysis)] to obtain a post-leaching solution.

The amounts of the pure water and sulfuric acid added were adjusted so that the nickel concentration in the leachate was about 120 g/l when the post-water-washing crude nickel hydroxide was completely dissolved.

The post-leaching solution and the residue after filtration were analyzed for the components to confirm whether each element was distributed to the post-leaching solution or the residue.

The analysis was performed with an ICP emission spectrometer.

Next, the "leaching process" was performed under the same conditions and operations as the case where the pH was adjusted to 0.5 to 2.1 except that the pH of the leachate was adjusted to 0.0.

Then, the "leaching process" was performed under the same conditions and operations as the case where the pH was adjusted to 0.5 to 2.1 except that the pH of the leachate was adjusted to a range of 3.4 to 5.5.

Figure 4:
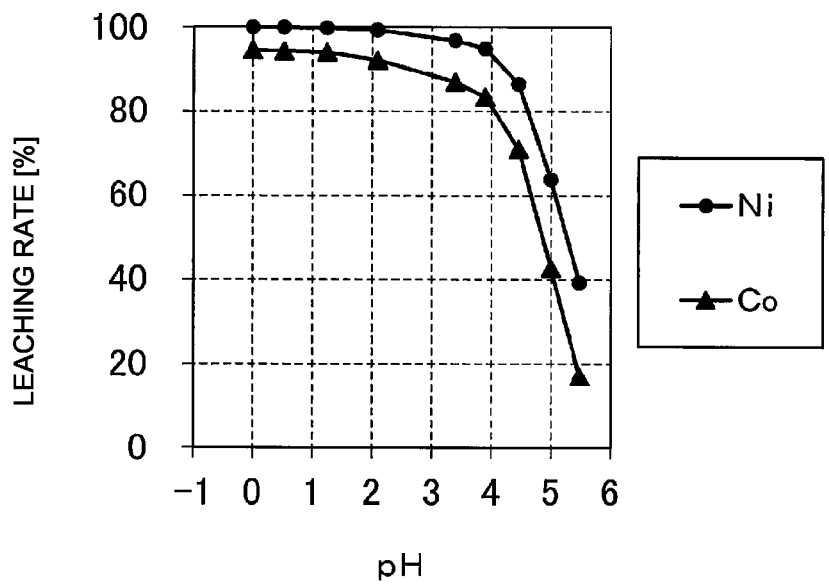
FIG. 4 is a graph showing the relationship between the pH of a leachate and the leaching rates of metals (nickel and cobalt).

The results of the above analyses are shown in Table 4 and FIG. 4.

TABLE 3

| | Mg [wt %] |
|---|---|
| Post-water-washing crude nickel hydroxide | 0.8 |

TABLE 4

| [Leaching process] | pH | Leaching rate | |
|---|---|---|---|
| | | Ni [wt %] | Co [wt %] |
| pH 0.5 to 2.1 | 2.1 | 99 | 92 |
| | 1.3 | 100 | 94 |
| | 0.5 | 100 | 94 |
| pH 0.0 | 0.0 | 100 | 94 |
| pH 3.4 to 5.5 | 5.5 | 39 | 17 |
| | 5.0 | 64 | 43 |
| | 4.5 | 86 | 71 |
| | 3.9 | 95 | 83 |
| | 3.4 | 97 | 87 |

From Table 4 and FIG. 4, it can be seen that, when the pH of the leachate was adjusted to be in the pH range of 3.4 to 5.5, which was higher than 2.1, the leaching rates of nickel and cobalt into the leachate decreased. In addition, when the pH was adjusted to 0.0, the leaching rates were the same as the case where the pH was adjusted to 0.5. When the pH was adjusted to be lower than 0.5, the leaching rates hardly rose, while only the amount of the acid used rose.

Therefore, it can be said that the pH adjustment range of the leachate suitable for the leaching process is 0.5 to 2.1 in which range decrease in the leaching rates of nickel and cobalt into the leachate is suppressed and the acid can be used efficiently.

[Neutralization Process]

Conditions of a "neutralization process" performed subsequent to the "leaching process" will be described.

The pH of the leachate prepared in the leaching process was adjusted to 1.0 to obtain a post-leaching solution, and 80 ml of the post-leaching solution was measured, to which a post-water-washing crude nickel hydroxide (implemented at a slurry concentration of 200 g/l) was then added as a neutralizer to adjust the pH to a range of 4.6 to 5.0.

The adjusted post-leaching solution was stirred with a motor and a stirring blade for 120 minutes and vacuum-filtered with a vacuum pump and a filter paper with specifications corresponding to 5 type C specified in JIS P 3801 [filter paper (for chemical analysis)] to obtain a post-neutralization solution.

The post-neutralization solution was analyzed with an ICP emission spectrometer.

Next, the "neutralization process" was performed under the same conditions and operations as the case where the pH was adjusted to the range of 4.6 to 5.0 except that the pH of the post-leaching solution was adjusted to be in a range of 3.5 to 4.2.

Then, the "neutralization process" was performed under the same conditions and operations as the case where the pH was adjusted to the range of 4.6 to 5.0 except that the pH of the post-leaching solution was adjusted to be in a range of 5.5 to 6.0.

Figure 5:
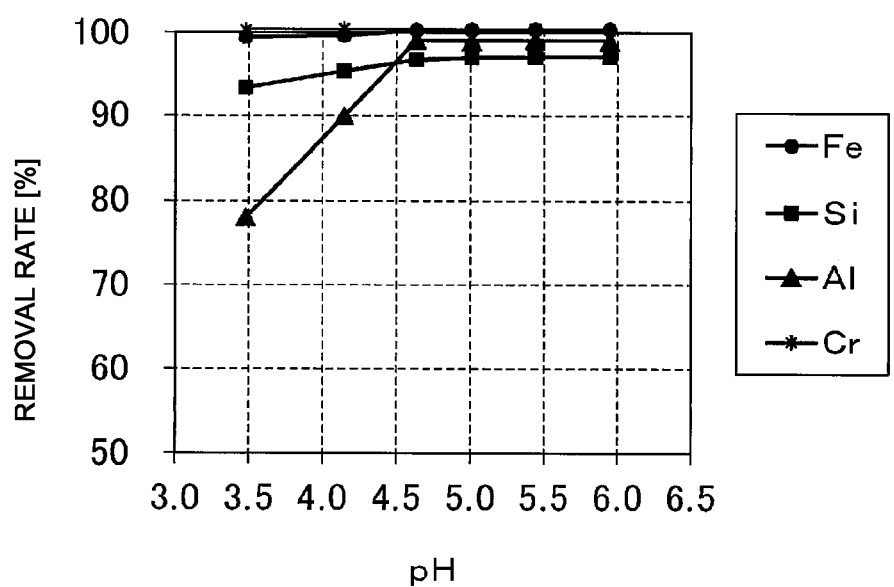
FIG. 5 is a graph showing the relationship between the pH of a post-leaching solution and the removal rates of metals (iron, silicon, aluminum, and chromium).

The results of the above analyses are shown in Table 5 and FIG. 5.

TABLE 5

| [Neutralization process] | pH | Removal rate | | | |
|---|---|---|---|---|---|
| | | Fe [wt %] | Si [wt %] | Al [wt %] | Cr [wt %] |
| pH 4.6 to 5.0 | 4.6 | 100 | 97 | 99 | 100 |
| | 5.0 | 100 | 97 | 99 | 100 |
| pH 3.5 to 4.2 | 3.5 | 99 | 93 | 78 | 100 |
| | 4.2 | 100 | 95 | 90 | 100 |
| pH 5.5 to 6.0 | 5.5 | 100 | 97 | 99 | 100 |
| | 6.0 | 100 | 97 | 99 | 100 |

From Table 5 and FIG. 5, it can be seen that the removal rate of aluminum decreased when the pH of the post-leaching solution was adjusted to be in the range of 3.5 to 4.2, in which range the pH of the post-neutralization solution became lower than 4.6. On the contrary, when the pH of the post-leaching solution was adjusted to be in the rage of 5.5 to 6.0, which was higher than 5.0, the removal rate hardly rose, while only the amount of the alkali used rose.

Therefore, it can be said that the pH adjustment range of the post-neutralization solution suitable for the neutralization process is 4.6 to 5.0 in which range decrease in the removal rate of aluminum is suppressed and the alkali can be used efficiently.

[Extraction Process]

Conditions of an "extraction process" performed subsequent to the "neutralization process" will be described.

A post-neutralization solution obtained by adjusting the pH to 4.6 in the neutralization process and an extractant were prepared. The extractant was such that an alkylphosphonic acid ester (bis (2-ethylhexyl) phosphate (trade name: BAYSOLVEX D2EHPA, manufactured by LANXESS Deutschland GmbH)) and a naphthenic solvent (trade name: TECLEAN N20, manufactured by JX Nippon Oil & Energy Corporation) were mixed so as to be 40% by volume and 60% by volume, respectively. Then the post-neutralization solution as an extraction starting solution was brought into contact with the extractant.

Table 6 shows the concentrations of manganese, magnesium, calcium, zinc, and copper in the post-neutralization solution when the pH was adjusted to 4.6.

The above contact was performed in a multi-stage countercurrent with a mixer settler, and the reaction was sufficiently performed, with the pH adjusted, to separate phases, thereby obtaining a post-extraction organic phase as an organic phase and a post-extraction solution as an aqueous phase. At the time of the pH adjustment, sodium hydroxide was added as a pH adjusting agent to adjust the pH of the post-extraction solution to 2.0 to 2.4.

The post-extraction organic phase as the organic phase and the post-extraction solution as the aqueous phase after the phase separation were each collected, and the metal concentrations were analyzed with an ICP emission spectrometer.

Next, the "extraction process" was performed under the same conditions and operations as the case where the pH of the post-extraction solution was adjusted to 2.0 to 2.4 except that the pH of the post-extraction solution was adjusted to be 1.8 or more and less than 2.0.

Then, the "extraction process" was performed under the same conditions and operations as the case where the pH of the post-extraction solution was adjusted to 2.0 to 2.4 except that the pH of the post-extraction solution was adjusted to be more than 2.4 and 2.6 or less.

The results of the above analyses are shown in Table 7.

TABLE 6

| | Mg | Ca | Zn | Cu | Mn |
|---|---|---|---|---|---|
| Post-neutralization solution | 8.5 | 0.38 | 0.12 | 3.8 | 16 |

[unit: g/l]

TABLE 7

| [Extraction process] | Extraction rate | | | | | | |
|---|---|---|---|---|---|---|---|
| | Ni [wt %] | Co [wt %] | Mg [wt %] | Ca [wt %] | Zn [wt %] | Cu [wt %] | Mn [wt %] |
| pH 2.0 to 2.4 | 8.5 | 29 | 99 | ≈100 | ≈100 | ≈100 | ≈100 |
| pH 1.8 or more, less than 2.0 | 3.8 | 15 | 56 | ≈100 | ≈100 | 94 | ≈100 |
| pH more than 2.4, 2.6 or less | 11 | 41 | ≈100 | ≈100 | ≈100 | ≈100 | ≈100 |

When the pH of the post-extraction solution was adjusted to be in the range of 2.0 to 2.4, impurities such as manganese, magnesium, calcium, zinc, and copper were mostly distributed to the post-extraction organic phase and removed from the post-extraction solution.

When the pH was adjusted to be in the range of 1.8 or more and less than 2.0, the distribution rates of the above impurities to the post-extraction organic phase decreased.

On the other hand, when the pH was adjusted to be in the range of more than 2.4 and 2.6 or less, the distribution rates of nickel and cobalt to the post-extraction organic phase increased. The increase in the distribution rates of nickel and cobalt to the post-extraction organic phase indicates increase in nickel and cobalt losses.

Therefore, it can be said that the pH adjustment range of the post-extraction solution suitable for the extraction process is 2.0 to 2.4 in which range decrease in the distribution rates of the impurities to the post-extraction organic phase and increase in nickel and cobalt losses are suppressed.

Furthermore, the impurities contained in the post-extraction solution are greatly reduced qualitatively and quantitatively from the status of the impurities in the crude nickel hydroxide shown in Table 1 as the starting material to the status of the impurities in the post-extraction solution shown in Table 8.

By using the crude nickel hydroxide having the composition shown in Table 1 as a starting material and carrying out the "water-washing process", the "leaching process", the "neutralization process", and the "extraction process" according to the manufacturing flow of FIG. 1, a high purity nickel-cobalt-containing solution having a composition shown in Table 8 was obtained and enabled to be used as a raw material for a positive electrode material of a secondary battery.

TABLE 8

| | Ni [g/l] | Co [g/l] | Mg [g/l] | Ca [g/l] | Zn [g/l] | Cu [g/l] | Mn [g/l] | Fe [g/l] | Si [g/l] | Al [g/l] | Cr [g/l] |
|---|---|---|---|---|---|---|---|---|---|---|---|
| Solution containing Ni and Co | 100 | 2.4 | 0.028 | <0.001 | <0.001 | <0.001 | <0.001 | <0.001 | 0.051 | <0.001 | <0.001 |

[Washing Process]

Conditions of a "washing process" performed subsequent to the "extraction process" will be described.

A "washing process" was performed in which pure water was brought into contact with the post-extraction organic phase obtained by adjusting the pH of the post-extraction solution to the range of 2.0 to 2.4 in the extraction process. The contact was performed in a multi-stage countercurrent with a mixer settler, and the reaction was sufficiently performed, with the pH adjusted, to separate phases, thereby obtaining a post-washing organic phase as an organic phase and a post-washing solution as an aqueous phase. At the time of the pH adjustment, sulfuric acid was added as a pH adjusting agent to adjust the pH of the post-washing solution to 1.7 to 2.3.

The post-washing organic phase as the organic phase and the post-washing solution as the aqueous phase after the phase separation were each collected, and the metal concentrations were analyzed with an ICP emission spectrometer.

Next, the "washing process" was performed under the same conditions and operations as the case where the pH of the post-washing solution was adjusted to 1.7 to 2.3 except that the pH of the post-washing solution was adjusted to be 1.5 or more and less than 1.7.

Then, the "washing process" was performed under the same conditions and operations as the case where the pH of the post-washing solution was adjusted to 1.7 to 2.3 except that the pH of the post-washing solution was adjusted to be more than 2.3 and 2.5 or less.

The results of the above analyses are shown in Table 9.

TABLE 9

| | Distribution rate | | | | | | |
|---|---|---|---|---|---|---|---|
| [Washing process] | Ni [wt %] | Co [wt %] | Mg [wt %] | Ca [wt %] | Zn [wt %] | Cu [wt %] | Mn [wt %] |
| pH 1.7 to 2.3 | 99.9 | 97 | 30 | 0.44 | 0.23 | 5.9 | 1.8 |
| pH 1.5 or more, less than 1.7 | ≈100 | 99 | 57 | 0.81 | 0.45 | 14 | 4.8 |
| pH more than 2.3, 2.5 or less | 97 | 89 | 19 | 0.14 | 0.01 | 2.7 | 0.6 |

When the pH of the post-washing solution was adjusted to the range of 1.7 to 2.3, nickel and cobalt were mostly distributed to the post-washing solution, and impurities such as manganese, magnesium, calcium, zinc, and copper were mostly distributed to the post-washing organic phase, and thus the post-washing solution became an acid that could be preferably used as the acid used in the leaching process. When the pH was adjusted to be in the range of 1.5 or more and less than 1.7, the distribution rates of the above impurities including nickel and cobalt to the post-washing solution increased.

On the other hand, when the pH was adjusted to be in the range of more than 2.3 and 2.5 or less, the distribution rates of nickel and cobalt to the post-washing solution decreased. The decrease in the distribution rates of nickel and cobalt to the post-washing solution indicates increase in nickel and cobalt losses.

Therefore, it can be said that the pH adjustment range of the post-washing solution suitable for the washing process is 1.7 to 2.3 in which range increase in the distribution rates of the impurities to the post-washing solution and increase in nickel and cobalt losses are suppressed.

[Back Extraction Process]

Conditions of a "back extraction process" performed subsequent to the "washing process" will be described.

A "back extraction process" was performed in which pure water was brought into contact with the post-washing organic phase obtained by adjusting the pH of the post-washing solution to the range of 1.7 to 2.3 in the washing process. The contact was performed in a multi-stage countercurrent with a mixer settler, and the reaction was sufficiently performed, with the pH adjusted, to separate phases, thereby obtaining a post-back-extraction organic phase as an organic phase and a post-back-extraction solution as an aqueous phase.

At the time of the pH adjustment, hydrochloric acid was added as a pH adjusting agent to adjust the pH of the post-back-extraction solution to be in a range of 0.2 to 0.5.

The post-back-extraction organic phase as the organic phase and the post-back-extraction solution as the aqueous phase after the phase separation were each collected, and the metal concentrations were analyzed with an ICP emission spectrometer.

Next, the "back extraction process" was performed under the same conditions and operations as the case where the pH of the post-back-extraction solution was adjusted to the range of 0.2 to 0.5 except that the pH of the post-back-extraction solution was adjusted to be in a range of 0.0 or more and less than 0.2.

Then, the "back extraction process" was performed under the same conditions and operations as the case where the pH of the post-back-extraction solution was adjusted to be in the range of 0.2 to 0.5 except that the pH of the post-back-extraction solution was adjusted to a range of more than 0.5 and 0.7 or less.

The results of the above analyses are shown in Table 10.

TABLE 10

| [Back extraction process] | Back extraction rate | | | | | | |
|---|---|---|---|---|---|---|---|
| | Ni [wt %] | Co [wt %] | Mg [wt %] | Ca [wt %] | Zn [wt %] | Cu [wt %] | Mn [wt %] |
| 0.2 to 0.5 | ≈100 | ≈100 | ≈100 | 91 | 83 | ≈100 | ≈100 |
| 0.0 or more, less than 0.2 | ≈100 | ≈100 | ≈100 | 95 | 89 | ≈100 | ≈100 |
| more than 0.5, 0.7 or less | ≈100 | ≈100 | ≈100 | 85 | 70 | ≈100 | ≈100 |

When the pH of the post-back-extraction solution was adjusted to be in the range of 0.2 to 0.5, impurities such as manganese, magnesium, calcium, zinc, and copper were mostly distributed to the post-back-extraction solution, and thereby the post-back-extraction organic phase could be reused as an extraction solvent.

When the pH was adjusted to be in the range of 0.0 or more and less than 0.2, the distribution rates of the above impurities to the post-back-extraction solution hardly rose, while only the amount of the acid used rose, which was inefficient.

On the other hand, when the pH was adjusted to be in the range of more than 0.5 and 0.7 or less, the distribution rates of the impurities to the post-back-extraction solution decreased.

Therefore, it can be said that a suitable pH adjustment range of the post-back-extraction solution in the back-extraction process is 0.2 to 0.5 in which range decrease in the distribution rates of the impurities to the post-back-extraction solution is suppressed and the acid can be used efficiently.

Example 2

In Example 2, an embodiment in which a crude cobalt hydroxide is used as a starting material will be described.

First, a hydroxide having a composition shown in Table 11 was prepared as a crude cobalt hydroxide.

Next, in order to make a slurry having a concentration of 200 g/l, the crude cobalt hydroxide was measured and fed into a beaker, to which pure water was then added to adjust the slurry concentration to the predetermined concentration. The adjusted slurry was subjected to the "water-washing process" in which the slurry was stirred with a stirring blade for 30 minutes, and then vacuum-filtered with a vacuum pump and a filter paper with specifications corresponding to 5 type C specified in JIS P 3801 [filter paper (for chemical analysis)].

A sediment obtained by the filtration was washed with pure water flowing onto it to obtain a post-water-washing crude cobalt hydroxide. The used washing water was mixed with a filtrate.

TABLE 11

|  | Ni | Co | Mg | Ca | Zn | Cu | Mn | Fe | Si | Al | Cr |
|---|---|---|---|---|---|---|---|---|---|---|---|
| Crude cobalt hydroxide | 0.73 | 29 | 6 | 0.6 | 0.05 | 1.3 | 6.7 | 0.064 | 0.67 | 0.052 | 0.0018 |

[unit: g/l]

Then, the post-water-washing crude cobalt hydroxide obtained was measured and fed into a beaker, to which pure water and sulfuric acid were then added as a leachate, and the reaction solution was stirred with a motor and a stirring blade for 120 minutes with the pH adjusted to 1.3 and then vacuum-filtered with a vacuum pump and a filter paper with specifications corresponding to 5 type C specified in JIS P 3801 [filter paper (for chemical analysis)] to obtain a post-leaching solution.

The amounts of the pure water and sulfuric acid added were adjusted so that the cobalt concentration in the leachate was about 100 g/l when the post-water-washing crude cobalt hydroxide was completely dissolved.

Next, 150 ml of the post-leaching solution prepared was measured, to which a post-water-washing crude cobalt hydroxide (implemented at a slurry concentration of 200 g/l) was then added as a pH adjusting agent to adjust the pH to 4.6, and the solution was stirred with a motor and a stirring blade for 120 minutes and then vacuum-filtered with a vacuum pump and a filter paper with specifications corresponding to 5 type C specified in JIS P 3801 [filter paper (for chemical analysis)] to obtain a post-neutralization solution.

Next, the post-neutralization solution obtained and an extractant were prepared. The extractant was such that an alkylphosphonic acid ester (bis (2-ethylhexyl) phosphate (trade name: BAYSOLVEX D2EHPA, manufactured by LANXESS Deutschland GmbH)) and a naphthenic solvent (trade name: TECLEAN N20, manufactured by JX Nippon Oil & Energy Corporation) were mixed so as to be 40% by volume and 60% by volume, respectively. Then the post-neutralization solution as an extraction starting solution was brought into contact with the extractant.

The above contact was performed in a multi-stage countercurrent with a mixer settler, and the reaction was sufficiently performed, with the pH adjusted, to separate phases, thereby obtaining a post-extraction organic phase as an organic phase and a post-extraction solution as an aqueous phase. At the time of the pH adjustment, sodium hydroxide was added as a pH adjusting agent to adjust the pH of the post-extraction solution to 2.2.

The post-extraction organic phase as the organic phase and the post-extraction solution as the aqueous phase after the phase separation were each collected, and the metal concentrations were analyzed with an ICP emission spectrometer. As a result, the post-extraction solution having a composition shown in Table 12 was obtained, and it was confirmed that the impurities contained were greatly reduced qualitatively and quantitatively from the crude cobalt hydroxide as the starting material (having the composition shown in Table 11).

TABLE 12

|  | Ni | Co | Mg | Ca | Zn | Cu | Mn | Fe | Si | Al | Cr |
|---|---|---|---|---|---|---|---|---|---|---|---|
| Solution containing Co and Ni (post-extraction solution) | 2.6 | 90 | 0.035 | <0.001 | <0.001 | <0.001 | 0.001 | <0.001 | 0.067 | <0.001 | <0.001 |

[unit: g/l]

Furthermore, the "washing process" was performed in which pure water was brought into contact with the post-extraction organic phase obtained by adjusting the pH of the post-extraction solution prepared to 2.2. The contact was performed in a multi-stage countercurrent with a mixer settler, and the reaction was sufficiently performed, with the pH adjusted, to separate phases, thereby obtaining a post-washing organic phase as an organic phase and a post-washing solution as an aqueous phase. At the time of the pH adjustment, sulfuric acid was added as a pH adjusting agent to adjust the pH of the post-washing solution to 1.7 to 2.3.

Next, the post-washing organic phase obtained was brought into contact with pure water to perform the "back extraction process".

The contact was performed in a multi-stage countercurrent with a mixer settler, and the reaction was sufficiently performed, with the pH adjusted, to separate phases, thereby obtaining a post-back-extraction organic phase as an organic phase and a post-back-extraction solution as an aqueous phase.

At the time of the pH adjustment, hydrochloric acid was added as a pH adjusting agent to adjust the pH of the post-back-extraction solution to be in a range of 0.2 to 0.5.

The post-back-extraction organic phase as the organic phase and the post-back-extraction solution as the aqueous phase after the phase separation were each collected, and the metal concentrations were analyzed with an ICP emission spectrometer.

As a result, impurities such as manganese, magnesium, calcium, zinc, and copper are mostly distributed to the post-extraction solution and can be discharged outside the system, and the organic phase of the post-back-extraction organic phase with reduced impurities can be reused as an extractant (organic phase) for solvent extraction in the extraction process, which can be performed without bringing the impurities into the extraction process and makes it possible to enhance production efficiency, save resources, and reduce costs accordingly.

Example 3

In Example 3, an embodiment in which a mixture of a crude nickel hydroxide and crude cobalt hydroxide is used as a starting material will be described.

A cobalt-nickel-containing solution was prepared under the same conditions as in Example 2 except that a crude hydroxide mixture containing the crude cobalt hydroxide shown in Table 11 and the crude nickel hydroxide shown in Table 1 in a weight ratio of 1 to 9, was used as a starting material.

As a result, a post-extraction solution having a composition shown in Table 13 was obtained, and a cobalt-nickel-containing solution in which the impurities contained were reduced to almost the same level as in Example 1 and in Example 2 was obtained.

TABLE 13

| | Ni | Co | Mg | Ca | Zn | Cu | Mn | Fe | Si | Al | Cr |
|---|---|---|---|---|---|---|---|---|---|---|---|
| Solution containing Co and Ni (post-extraction solution) | 100 | 8.2 | 0.043 | <0.001 | <0.001 | <0.001 | <0.001 | <0.001 | 0.052 | <0.031 | <0.001 |

[unit: g/l]

Example 4

In Example 4, an embodiment will be described in which sodium hydrogen sulfite as a reducing agent is added to the leachate until the redox potential of the leachate becomes 715 [mV vs. NHE] or less in the leaching process of Example 1.

A cobalt-nickel-containing solution was prepared under the same conditions as in Example 1, except that, in the leaching process, the pH of the leachate was adjusted to 2.1 and sodium hydrogen sulfite as a reducing agent was added to the leachate until the redox potential of the leachate reached 715 [mV vs. NHE] or less, and then vacuum filtration was performed to obtain a post-leaching solution.

As a result, both cobalt and nickel were leached from the starting material at leaching rates of 99% or more in the leaching process, and a cobalt-nickel-containing solution were obtained, such that the impurity level was almost the same as that in the solution obtained in Example and the concentrations of both cobalt and nickel were higher.

Example 5

In Example 5, an embodiment will be described in which sodium hydrogen sulfite as a reducing agent is added to the leachate until the redox potential of the leachate becomes 715 [mV vs. NHE] or less in the leaching process of Example 2.

A cobalt-nickel-containing solution was prepared under the same conditions as in Example 2, except that, in the leaching process, the pH of the leachate was adjusted to 2.1 and sodium hydrogen sulfite as a reducing agent was added to the leachate until the redox potential of the leachate reached 715 [mV vs. NHE] or less, and then vacuum filtration was performed to obtain a post-leaching solution.

As a result, both cobalt and nickel were leached from the starting material at leaching rates of 99% or more in the leaching process, and a cobalt-nickel-containing solution were obtained, such that the impurity level was almost the same as that in the solution obtained in Example 2 and the concentrations of both cobalt and nickel were higher.

Example 6

In Example 6, an embodiment will be described in which, sodium hydrogen sulfite as a reducing agent is added to the leachate until the redox potential of the leachate becomes 715 [mV vs. NHE] or less in the leaching process of Example 3.

A cobalt-nickel-containing solution was prepared under the same conditions as in Example 3, except that, in the leaching process, the pH of the leachate was adjusted to 2.1 and sodium hydrogen sulfite as a reducing agent was added to the leachate until the redox potential of the leachate reached 715 [mV vs. NHE] or less, and then vacuum filtration was performed to obtain a post-leaching solution.

As a result, both cobalt and nickel were leached from the starting material at leaching rates of 99% or more in the leaching process, and a cobalt-nickel-containing solution were obtained, such that the impurity level was almost the same as that in the solution obtained in Example 3 and the concentrations of both cobalt and nickel were higher.

The invention claimed is:
1. A method of manufacturing a cobalt-nickel-containing solution, the method comprising:
   preparing at least one of a crude nickel hydroxide and a crude cobalt hydroxide as a starting material,
   the crude nickel hydroxide containing cobalt and nickel, and one or more elements of magnesium, calcium, iron, silicon, manganese, zinc, copper, aluminum, and chromium other than the cobalt and nickel as impurities, and containing the nickel more than the cobalt, and
   the crude cobalt hydroxide containing cobalt and nickel, and one or more elements of magnesium, calcium, iron, silicon, manganese, zinc, copper, aluminum, and chromium other than the cobalt and nickel as impurities, and containing the cobalt more than the nickel,
   a water-washing process of adding water to the starting material, stirring and mixing it to form a slurry, filtering the slurry to obtain a sediment, washing the sediment with water to reduce one or more of the impurities from the sediment, thereby obtaining a post-water-washing crude hydroxide;
   a leaching process of subjecting the post-water-washing crude hydroxide to leaching with an acid to obtain a post-leaching solution containing cobalt and nickel;
   a neutralization process of adding a pH adjusting agent the post-leaching solution to perform neutralization, and subjecting it to solid-liquid separation to remove a post-neutralization residue, thereby obtaining a post-neutralization solution;
   an extraction process of subjecting the post-neutralization solution obtained to solvent extraction with an extractant, thereby obtaining a post-extraction solution containing both cobalt and nickel with the impurities reduced;
   a washing process of back-extracting a part of nickel and cobalt contained in a post-extraction organic phase obtained in the extraction process into an aqueous phase to remove one or more of manganese, magnesium, calcium, zinc, and copper as the impurities into a post-washing organic phase as an organic phase, thereby obtaining a post-washing solution as the aqueous phase containing nickel and cobalt with the impurities reduced; and
   a back extraction process of further subjecting the post-washing organic phase to back extraction to back-extract manganese, magnesium, calcium, zinc, and copper as the impurities into an aqueous phase and to remove the impurities into a post-back-extraction solution as the aqueous phase, thereby obtaining a post-back-extraction organic phase with the impurities reduced.

* * * * *